United States Patent
Morowsky et al.

(10) Patent No.: US 11,342,957 B2
(45) Date of Patent: May 24, 2022

(54) THREE-WAY RADIO SWITCH TO ALLOW FOR MANUAL AND AUTOMATIC STANDBY FREQUENCIES

(71) Applicant: Honeywell International Inc., Morris Plains, NJ (US)

(72) Inventors: Katarina Alexis Morowsky, Phoenix, AZ (US); Aaron J Gannon, Anthem, AZ (US); Ivan Sandy Wyatt, Scottsdale, AZ (US); Avery Burns, Stanwood, WA (US); Balaji Srinivasan, Bangalore (IN)

(73) Assignee: Honeywell International Inc., Charlotte, NC (US)

(*) Notice: Subject to any disclaimer, the term of this patent is extended or adjusted under 35 U.S.C. 154(b) by 499 days.

(21) Appl. No.: 16/399,555

(22) Filed: Apr. 30, 2019

(65) Prior Publication Data

US 2020/0280333 A1    Sep. 3, 2020

Related U.S. Application Data

(60) Provisional application No. 62/812,713, filed on Mar. 1, 2019.

(51) Int. Cl.
| | | |
|---|---|---|
| *G06F 3/0488* | (2022.01) | |
| *H04B 1/401* | (2015.01) | |
| *G08G 5/00* | (2006.01) | |
| *H04B 1/3822* | (2015.01) | |
| *H04B 1/44* | (2006.01) | |

(52) U.S. Cl.
CPC .......... *H04B 1/401* (2013.01); *G06F 3/0488* (2013.01); *G08G 5/0013* (2013.01);
(Continued)

(58) Field of Classification Search
CPC ........ H04B 1/401; H04B 1/3822; H04B 1/44; G06F 3/0488; G08G 5/0013; G08G 5/0021; G08G 5/0056; G08G 5/0052; G01C 23/00
See application file for complete search history.

(56) References Cited

U.S. PATENT DOCUMENTS 6,282,417 B1 *  8/2001  Ward ................... G08G 5/0021
                                                          455/431
7,039,139 B1     5/2006  Griffin
(Continued)

FOREIGN PATENT DOCUMENTS

FR           3025379 B1    3/2018

OTHER PUBLICATIONS

European Patent Office, "Extended European Search Report from EP Application No. 20159167.4", from Foreign Counterpart to U.S. Appl. No. 16/399,555, dated Jul. 23, 2020, pp. 1 through 9, Published: EP.

(Continued)

*Primary Examiner* — Phuong H Nguyen
(74) *Attorney, Agent, or Firm* — Fogg & Powers LLC

(57) ABSTRACT

A switching system comprises a three-way radio switch for an onboard radio system. The radio switch includes a manual standby frequency switch that receives and displays a standby frequency input by a user; an automated standby frequency switch that receives and displays a standby frequency automatically input by the system; and an active frequency switch that shows a currently selected frequency. The active frequency switch receives and displays the frequency from the manual standby frequency switch, or receives and displays the frequency from the automated standby frequency switch. A processor is operative to monitor frequencies of the radio system in real-time; compare the frequencies of the radio system with frequencies from a
(Continued)

database containing regional radio frequencies; trigger an alert when the frequencies of the radio system do not match the frequencies from the database; and send an updated standby radio frequency to the automated standby frequency switch.

13 Claims, 6 Drawing Sheets

(52) U.S. Cl.
CPC ......... *G08G 5/0021* (2013.01); *H04B 1/3822* (2013.01); *H04B 1/44* (2013.01)

(56) References Cited

U.S. PATENT DOCUMENTS

| | | | |
|---|---|---|---|
| 7,142,818 B2 | 11/2006 | Hunter et al. | |
| 9,094,087 B2 | 7/2015 | Malaga | |
| 9,379,688 B2 | 6/2016 | Sherwood et al. | |
| 9,703,476 B1 | 7/2017 | Pappas et al. | |
| 2009/0005034 A1* | 1/2009 | de la Tousche | G01C 23/00 455/431 |
| 2015/0081292 A1 | 3/2015 | Populus et al. | |
| 2015/0296500 A1* | 10/2015 | Kanovsky | H04B 7/18506 455/512 |

OTHER PUBLICATIONS

Avidyne, "IFD-Series Touch-Screen Aviation GPS Navigators", 2018, pp. 1-21, Avidyne Corporation.
European Patent Office, "Communication pursuant to Article 94(3) from EP Application No. 20159167.4", from Foreign Counterpart to U.S. Appl. No. 16/399,555, dated Feb. 2, 2022, pp. 1 through 9, Published: EP.

* cited by examiner

THREE-WAY RADIO SWITCH TO ALLOW FOR MANUAL AND AUTOMATIC STANDBY FREQUENCIES

CROSS REFERENCE TO RELATED APPLICATION

This application claims the benefit of priority to U.S. Provisional Application No. 62/812,713, filed on Mar. 1, 2019, which is herein incorporated by reference.

BACKGROUND

Current cockpits allow for pilots to have two different communication (COMM) channels. Each COMM channel is allowed one active frequency and one standby frequency. There has been a desire within the industry of automating frequency selection, but with such technology comes the risk of overriding a frequency that has been manually entered by a pilot. Overriding a frequency could cause pilot confusion, error, or at a minimum increased workload. Pilots work best when they are supported by automation, but still have direct system control.

Developments have been made to create ways to automatically update radio frequencies, since this would drastically reduce pilot workload (in most situations). However, anytime automation is introduced there is the potential of introducing negative consequences. In the case of automatically selected frequencies, automatically selecting a frequency would likely overwrite a manually selected frequency, since there is only a single standby frequency for a given COMM channel in current cockpits.

There have been several instances in recent years where there has been a communication failure between air traffic control (ATC) and commercial aircraft. Various categories of communication failures apart from system failures have been categorized as: an incorrect frequency assigned to an aircraft; tuning to an incorrect frequency on the aircraft radio; human error in not tuning to a new frequency; and radio congestion leading to blockage of a frequency. As such failures have a high impact on safety of operations, the airlines have been brought under scrutiny by the respective authorities and penalized. When the severity of the communication failure calls for the highest response, such as scrambling of military aircraft, authorities like the Federal Aviation Administration (FAA) may not only penalize but also can cancel a pilot's license and airline operations.

In present aircraft architectures there is a lack of systems that can detect communication failures and report such failures to the pilot or to ATC. Thus, there is a need to provide automated frequency updates that would allow for reduced pilot workload, without overwriting a manually entered standby frequency.

SUMMARY

A switching system comprises a three-way radio switch for an onboard radio system in a vehicle. The three-way radio switch includes a manual standby frequency switch configured to receive and display a standby radio frequency manually input by a user; an automated standby frequency switch configured to receive and display a standby radio frequency automatically input by the system; and an active frequency switch configured to show a currently selected radio frequency. The active frequency switch is operative to receive and display the radio frequency from the manual standby frequency switch when selected by the user; or receive and display the radio frequency from the automated standby frequency switch when selected by the user. A processor is in operative communication with the three-way radio switch. The processor is operative to execute instructions to perform a method comprising monitoring one or more frequencies of the onboard radio system in real-time; comparing the one or more frequencies of the onboard radio system with one or more frequencies from a database containing regional radio frequencies; triggering an alert to the user when the one or more frequencies of the onboard radio system do not match the one or more frequencies from the database; and sending an updated standby radio frequency to the automated standby frequency switch.

DRAWINGS

Understanding that the drawings depict only exemplary embodiments and are not therefore to be considered limiting in scope, the exemplary embodiments will be described with additional specificity and detail through the use of the accompanying drawings, in which.

DETAILED DESCRIPTION

Figure 1:
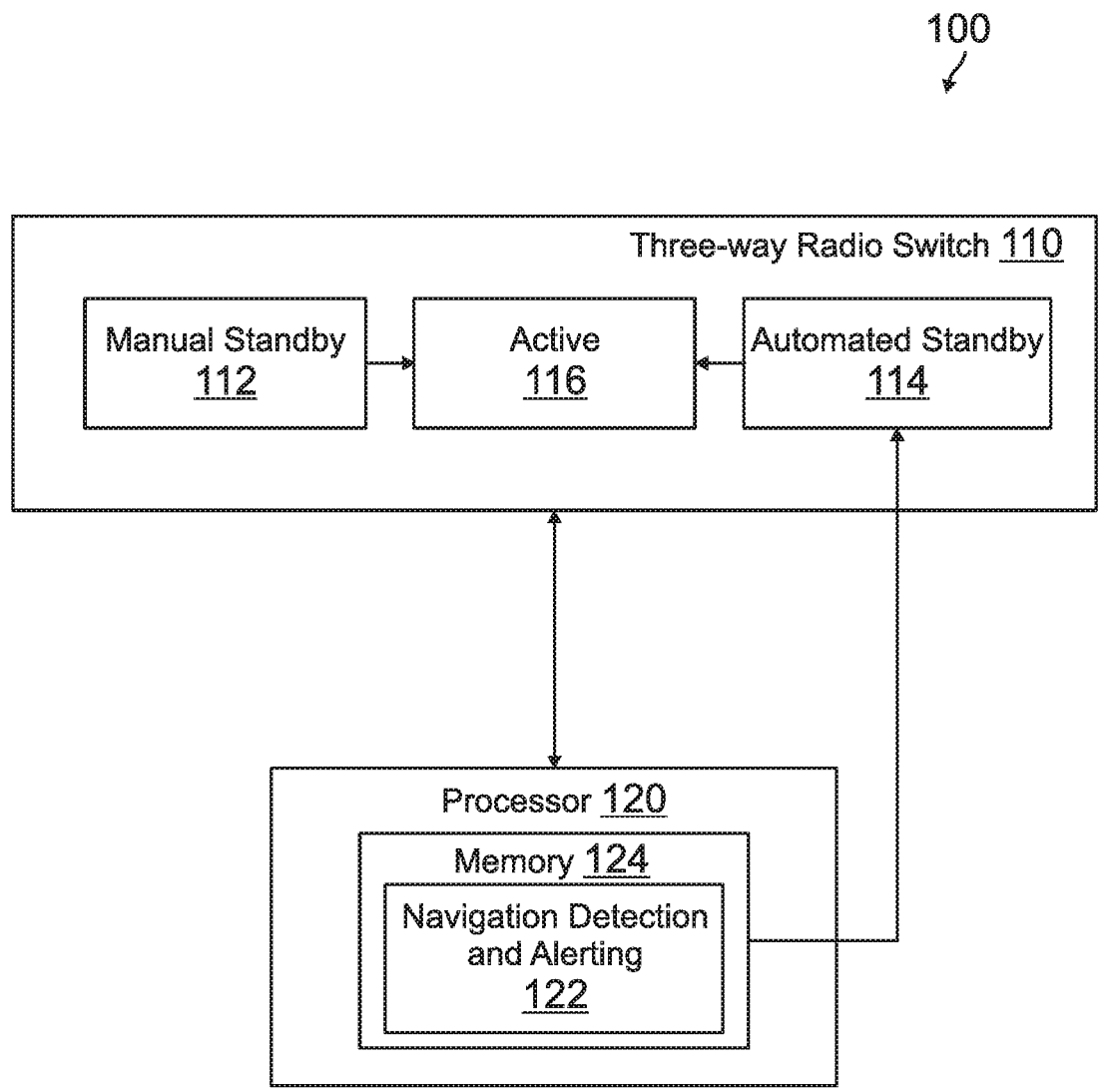
FIG. 1 is a block diagram of a switching system implemented with a three-way radio switch, according to one embodiment.

In the following detailed description, embodiments are described in sufficient detail to enable those skilled in the art to practice the invention. It is to be understood that other embodiments may be utilized without departing from the scope of the invention. The following detailed description is, therefore, not to be taken in a limiting sense.

A three-way radio switch is described herein that allows for both a manual selected standby frequency and an automated selected standby frequency. The three-way radio switch can be implemented in an onboard radio system in a vehicle such as an aircraft.

The three-way radio switch generally includes a manual standby frequency switch, an automated standby frequency switch, and an active frequency switch. The active frequency switch is operative to receive and display the radio frequency from the manual standby frequency switch when selected by the user, or to receive and display the radio frequency from the automated standby frequency switch when selected by the user.

The three-way radio switch can be implemented in a radio system that includes a processor in operative communication with the three-way radio switch. The processor is operative to monitor one or more frequencies of the radio system in real-time, and compare the one or more frequencies of the onboard radio system with one or more frequencies from a database containing regional radio frequencies. The processor is operative to trigger an alert to the user when the one or more frequencies of the onboard radio system do not match the one or more frequencies from the database, and send an updated standby radio frequency to the automated standby frequency switch.

The design of the three-way radio switch is intended to decrease pilot workload, whether the pilot uses a manual selected standby frequency (since the automation will not overwrite the selection), or an automated selected standby frequency (since the pilot does not have to perform the task of entering in a frequency). During normal conditions, the pilot will always have the correct frequency on standby, thus removing the need to select a radio frequency. The present design introduces the potential to increase pilot performance and reduce pilot workload on a frequently performed task.

In one embodiment, a three-way touchscreen radio switch can be implemented. A center touchscreen button of this switch is configured to show the active (currently selected) radio frequency in an active frequency window. To one side of the center touchscreen button, the manual selected standby frequency is shown in a window of a manual standby touchscreen button, and on the other side of the center touchscreen button an automated selected standby frequency is shown in a window of an automated standby touchscreen button. The manual selected radio frequency is entered by the pilot using a standard manual keyboard or by using a touchscreen keyboard. The automated selected standby frequency is updated automatically as data is processed.

The automated selected standby frequency is initially selected using data analytics that are tracking and processing aircraft position, vertical and lateral trajectory level, and frequencies before and after the frequency transition, as well as the time and location that the frequency transition took place. The automated selected standby frequency is updated based on the analytics, although an Air Traffic Control (ATC) request (captured using ATC Transcription) for ownship to change frequency will override the analytics and a new frequency will populate the automated selected standby frequency.

In addition to data analytics, the system can also look at the frequency a pilot sets in standby. For example, if the pilot is sitting at the hold short line on a runway, the pilot may have tuned to the tower frequency in active mode and departure in standby mode. As described further hereafter, the system can duplicate the manual frequency "to give confidence," or the system might not duplicate the tuning of departure in the automated standby field, but would either 1) wait until ready for another nomination (some time frame might be used, such as next-next frequency in a given time frame), or 2) might wait until some uncertainty was resolved (e.g., there will be n more departure frequencies on the way out today, but they depend upon altitude selections and/or radar vector turn directions).

The system can also look at altitude preselector updates and heading updates to inform these sorts of nominations, in comparison to a data map of frequency assignments to past aircraft trajectories. The altitude selection and heading bug help predict the ATC sector. If the pilot were behind, for example, sitting at the hold short line and tuned tower but forgot to tune departure into the manual standby, the system would nominate departure control into the automated standby field. If the pilot were even more behind (and forgot to tune tower into the active field), the tower frequency would be nominated into the automated standby field.

In one embodiment, to move a standby frequency into the active frequency window (thus activating the frequency on the communication (COMM) channel), the pilot selects and holds the chosen standby frequency and swipes toward the center of the touchscreen radio switch. For example, if the pilot selects the manual standby frequency, the manual standby frequency is then shown as being empty since a new manually entered frequency has not been provided. If the pilot moves the automated selected standby frequency to the active frequency window, then the automated selected standby frequency is updated for the next frequency and the manual standby frequency stays as is without changing.

In other embodiments, the present system can be implemented such that automatic frequencies that are displayed cannot be changed abruptly. For instance, if the "current" automated standby frequency changed to a "new" automated standby frequency at the very moment the pilot pressed the button to select the current automated standby frequency, the new automated standby frequency would be unintentionally tuned. Therefore, a time delay can be implemented between the current automated standby frequency being removed, and the new automated standby frequency being posted in the automated standby frequency window. There can also be a "fading away" interaction effect when the current automated standby frequency is being removed so the pilot has an expectation of its removal.

The present radio system also can be implemented with a data driven navigation detection and alerting system. The detection and alerting system provides a way to monitor, detect, and alert when an incorrect tuning of an aircraft radio frequency occurs, which can be from pilot error or from ATC error. The system receives relevant data inputs from different onboard systems, monitors these inputs for noncompliance, and alerts the relevant onboard and on-ground members when noncompliance is detected.

During monitoring and detecting, the frequency of the onboard radio systems is continually monitored in real time. Based on the aircraft positional information along with the current flight plan, the frequency to which the aircraft radio is tuned is compared against a regional frequency. These regional radio frequencies can be obtained from terrain and/or navigation databases, and can be coded as a part of database elements. These frequencies can be saved as a relational database based on the continent/country of origin.

If a discrepancy in the monitored frequency is detected and identified, various alert notifications can be triggered for providing situational awareness. For example, the pilot can be notified using aural and or visual indicators on the onboard display system such as a navigation display or other sensory outputs. An airliner can be notified using an automated broadcast messaging system, such as automatic dependent surveillance-broadcast (ADS-B) or ADS-contract (ADS-C). In addition, ATC can be notified using the automated broadcast messaging system.

As the system monitors the radios, and in the case if none of the radios are tuned to an emergency frequency, the alert notification to the pilot and airliner as mentioned earlier can be deployed. Additionally, this will aid ATC to know exactly what frequency the radio is tuned to on the airplane in order to allow another avenue to contact the pilot. This will enable the channel for the ground to reach the pilot before being threatened by fighter aircraft, for example.

The software of the navigation detection and alerting system is operative to provide a selectable option so airlines can use the system when aircraft fly over geo-political hot spots that are life threatening/non-friendly regions. The system software is also operative to detect out of coverage areas, such as oceanic flights, such that the pilot can pre-tune the frequency where the airplane is expected to re-enter controlled airspace.

The navigation detection and alerting system is feasible in most commercial airplanes which have all mandatory systems as a part of their onboard equipment list. For private jets or helicopters there can be non-availability of onboard systems. In order to address this issue, the detection and alerting system can be placed in a public or private cloud, such that the system position is sufficient for monitoring and detecting any radio frequency conflicts, and alerting the crew and ATC of such conflicts.

In one implementation, the detection and alerting system functions can be provided in a software as a service (SaaS). In this regard, a software subscription can be provided based on pay as you use, or for a fixed time, or for a certain number of flights per region.

The detection and alerting system provides various benefits, including: detection and correction of the occurrence of error by a pilot or by ATC; avoiding fear of life to onboard travelers from regional fighter jet threats due to an incorrectly tuned radio; elimination of delays by not being forced to land and/or having different countries intervening to resolve the situation; and elimination of penalties on airlines due to noncompliance during aircraft flights.

Further details of various embodiments are described hereafter with reference to the drawings.

FIG. 1 is a block diagram of a switching system 100, according to one embodiment. The switching system 100 includes a three-way radio switch 110 for an onboard radio in a vehicle, such as aircraft.

The three-way radio switch 110 comprises a manual standby frequency switch 112 configured to receive and display a standby radio frequency manually input by a user such as a pilot. An automated standby frequency switch 114 is configured to receive and display a standby radio frequency automatically input by system 100. An active frequency switch 116 is configured to show a currently selected radio frequency. The active frequency switch 116 is operative to receive and display the radio frequency from the manual standby frequency switch 112 when selected by the user. The active frequency switch 116 is also operative to receive and display the radio frequency from the automated standby frequency switch 114 when selected by the user.

The switching system 100 also includes a processor 120 in operative communication with three-way radio switch 110. A navigation detection and alerting algorithm 122 is stored in a memory unit 124 associated with processor 120. The processor 120 is operative to execute instructions to perform the method of algorithm 122, which is described in further detail with reference to the flow diagram of FIG. 2.

The radio switch 110 can be implemented as an interface that allows for the selection of an automatically generated standby frequency or frequencies, or a manually entered standby frequency or frequencies.

In one embodiment, radio switch 110 can be implemented as a touchscreen radio switch. In this embodiment, each of manual standby frequency switch 112, automated standby frequency switch 114, and active frequency switch 116 are implemented with touchscreen soft buttons that include display windows for showing frequency information. Examples of the touchscreen radio switch implementation are described hereafter.

In other embodiments, radio switch 110 can be implemented with a traditional mechanical radio interface, which utilizes hard buttons such as mechanical buttons to select from a manually selected standby or a separate automatically selected standby into the active frequency. In such embodiments, each of the manual standby frequency switch, the automated standby frequency switch, and the active frequency switch, can be implemented with mechanical pushbuttons, for example.

Figure 2:
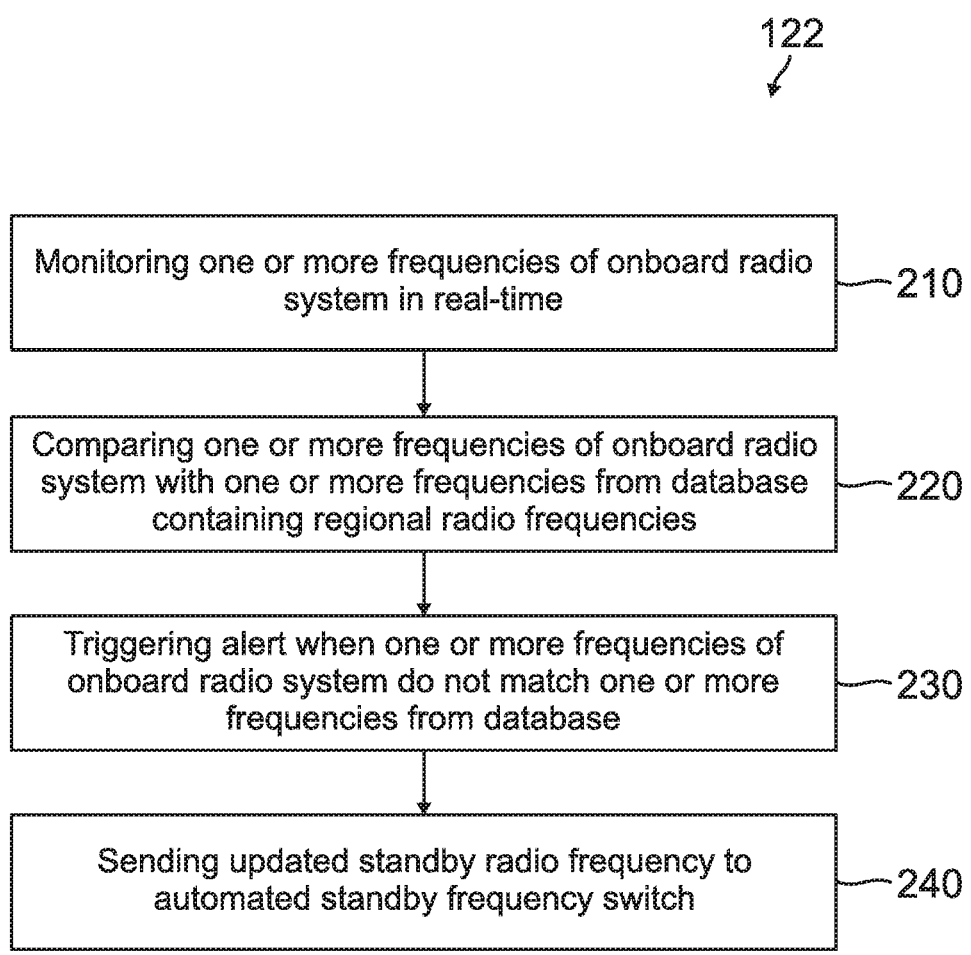
FIG. 2 is a flow diagram of a navigation detection and alerting method, which can be implemented in the switching system of FIG. 1.

As shown in FIG. 2, the method of algorithm 122 comprises monitoring one or more frequencies of the onboard radio system in real-time (block 210), and comparing the one or more frequencies of the onboard radio system with one or more frequencies from a database containing regional radio frequencies (block 220). The algorithm 122 triggers an alert to the user when the one or more frequencies of the onboard radio system do not match the one or more frequencies from the database (block 230). An updated standby radio frequency is then sent to the automated standby frequency switch 114 (block 240).

Figure 3:
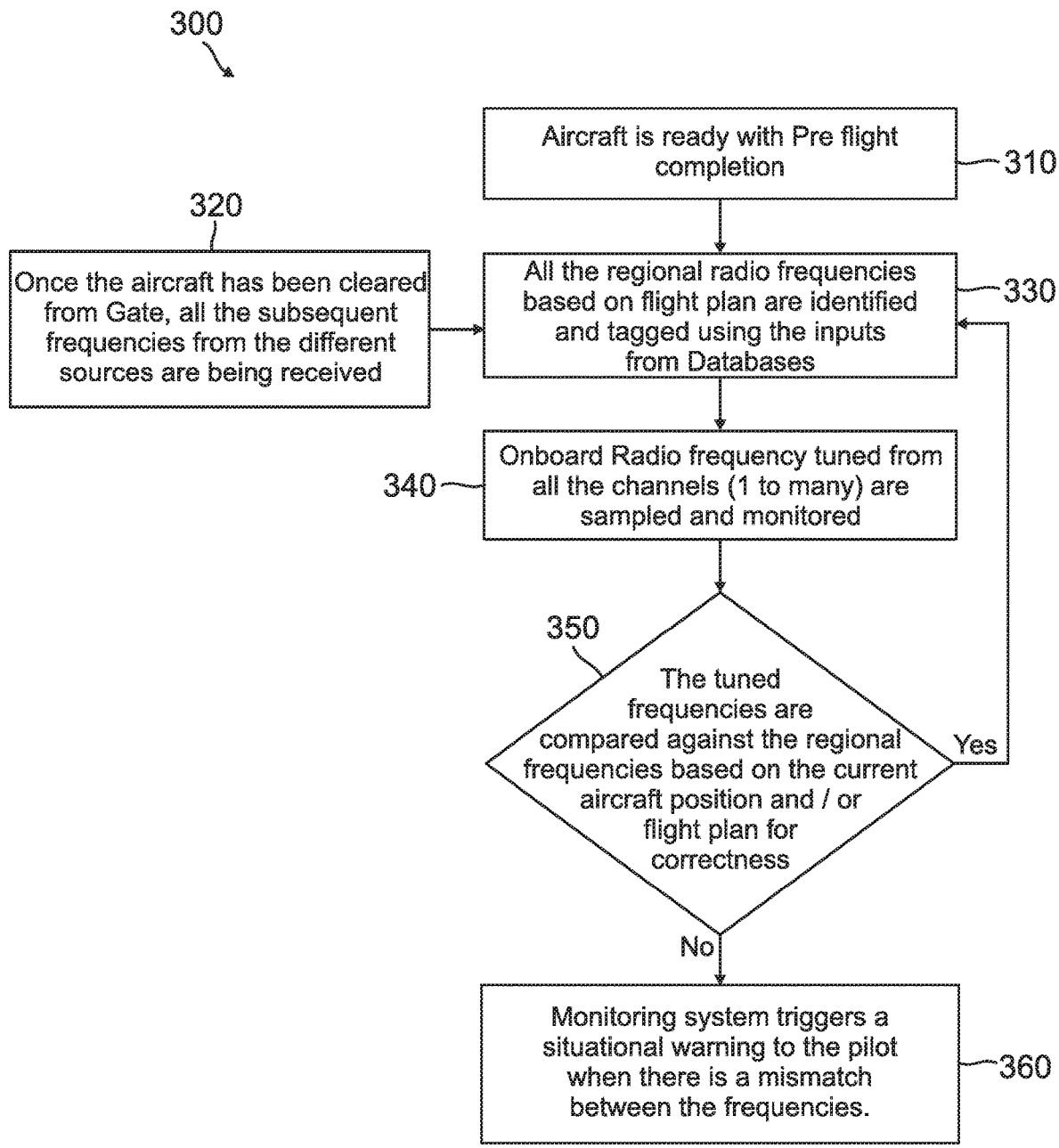
FIG. 3 is a flow diagram of a data driven navigation detection and alerting method, according to another implementation.

FIG. 3 is a flow diagram of another implementation of a data driven navigation detection and alerting method 300. The method 300 is operative to verify that a valid radio frequency is selected for the current position of an aircraft. Initially, method 300 verifies that the aircraft is ready with a pre-flight completion (block 310). Once the aircraft has been cleared from the gate, all the subsequent frequencies from the different sources are being received (block 320). All the regional frequencies based on the flight plan are then identified and tagged using the inputs from databases (block 330). The onboard radio frequency tuned from all the channels (one to many) are then sampled and monitored (block 340). The tuned frequencies are compared against the regional frequencies based on the current aircraft position and/or flight plan to determine correctness of the tuned frequencies (block 350). If the tuned frequencies are correct (Yes), then method 300 returns to block 330 and is repeated. If the tuned frequencies are not correct (No), the monitoring system triggers a situational warning to the pilot when there is a mismatch between the frequencies (block 360). If there is a mismatch, the system can be configured to send an ADS-B or ADS-C message and/or a datalink (DL) downlink message to an Airline Operational Center (AOC) and/or previously tuned ATC.

Figure 4A:
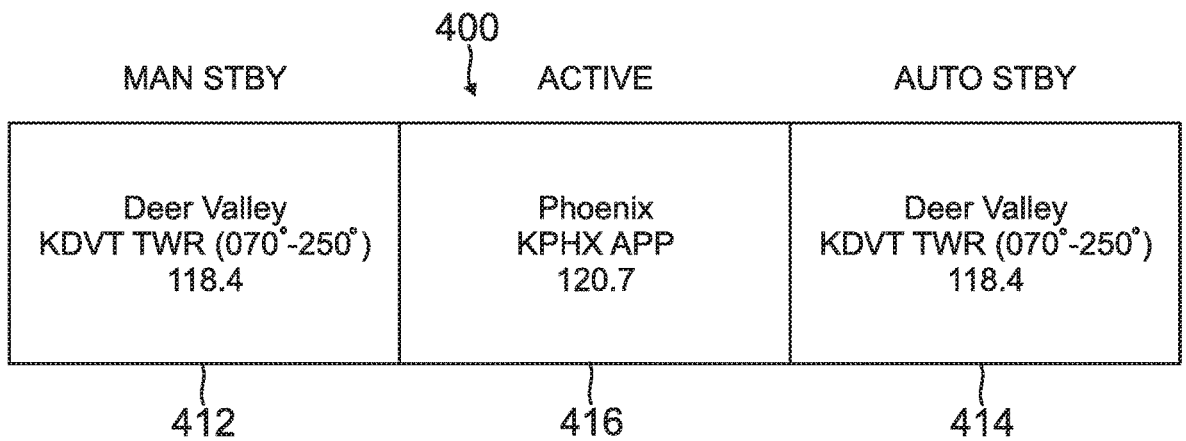
FIGS. 4A-4C are diagrams showing one exemplary design option and operation of a three-way radio switch implemented as a touchscreen radio switch.
Figure 4B:
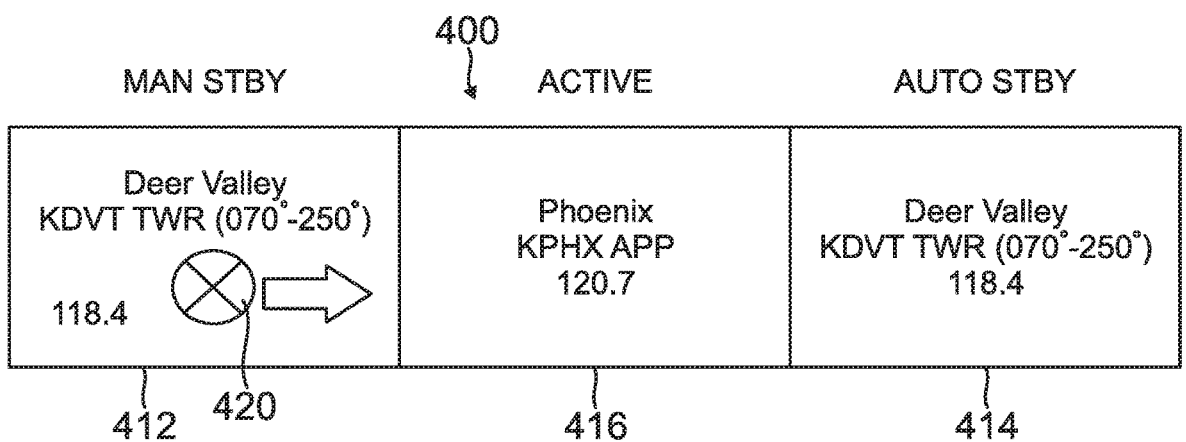
Figure 4C:
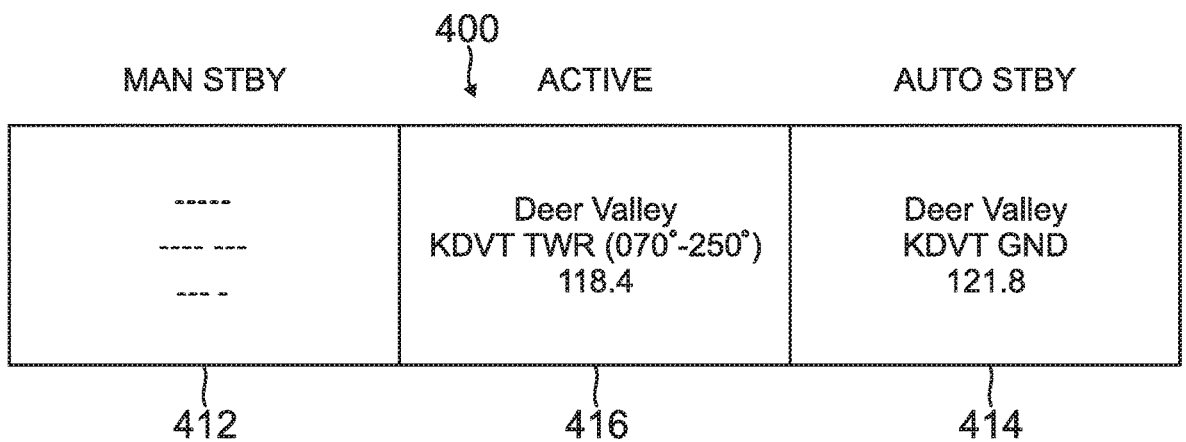

FIGS. 4A-4C illustrate one exemplary design option and operation for a three-way radio switch 400 implemented as a touchscreen radio switch for an aircraft. As shown in FIG. 4A, radio switch 400 comprises a manual standby (MAN STBY) button 412 configured to display a standby frequency manually input by the pilot (e.g., frequency of 118.4 MHz, Deer Valley KDVT tower (TWR)))(070°-250°. An automated standby (AUTO STBY) button 414 is configured to display a standby frequency automatically input by the radio system (e.g., frequency of 118.4 MHz, Deer Valley KDVT TWR (070°250)). An ACTIVE button 416 is configured to show a currently selected radio frequency (e.g., frequency of 120.7 MHz, Phoenix KPHX APP).

If the pilot has manually selected the next expected frequency (which the automation agrees with), AUTO STBY button 414 will show the same frequency as MAN STBY button 412 (in this example, both of buttons 414 and 412 show 118.4 MHz). This allows a pilot to have increased confidence that the AUTO STBY frequency is applicable for the next frequency, and aligns with habits that might be developed.

In one interaction option, the pilot can select the appropriate MAN STBY frequency by touching button 412 at 420 and swiping towards the center of switch 400 to move the MAN STBY frequency information to the ACTIVE frequency window of button 416, as shown in FIG. 4B. In another interaction option, the pilot can select the MAN STBY frequency by selecting (in a single press of button 412 at 420) the MAN STBY frequency, which will move the MAN STBY frequency information to the ACTIVE frequency window of button 416.

When the MAN STBY frequency is selected and moved to the ACTIVE frequency window of button 416, there is no manually entered STBY frequency shown by button 412, and the moved MAN STBY frequency information is now displayed by button 416, as depicted in FIG. 4C. The AUTO STBY button 414 is automatically updated to show the next expected frequency information (e.g., Deer Valley KDVT ground (GND), 121.8 MHz).

Figure 5A:
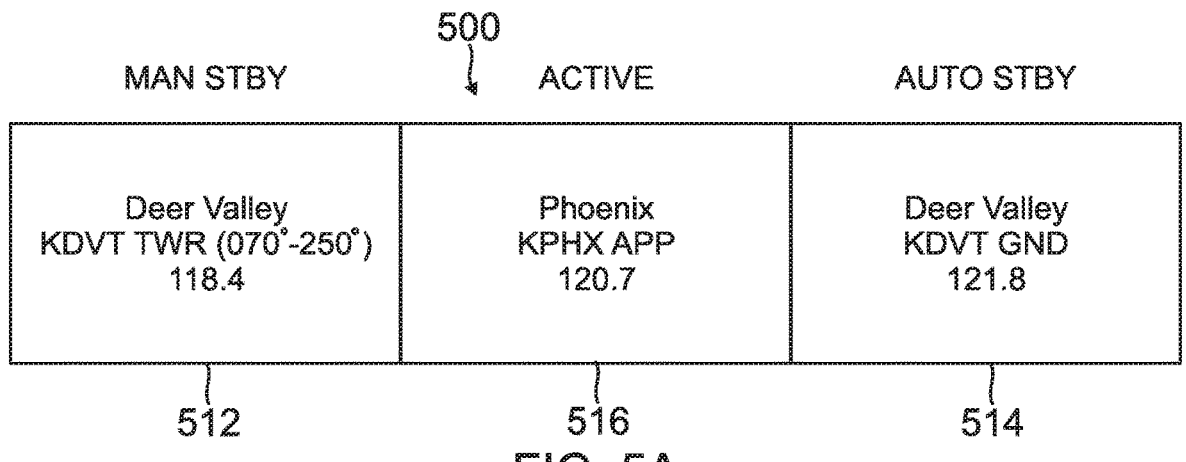
FIGS. 5A-5C are diagrams depicting another exemplary design option and operation of a three-way radio switch implemented as a touchscreen radio switch.
Figure 5B:
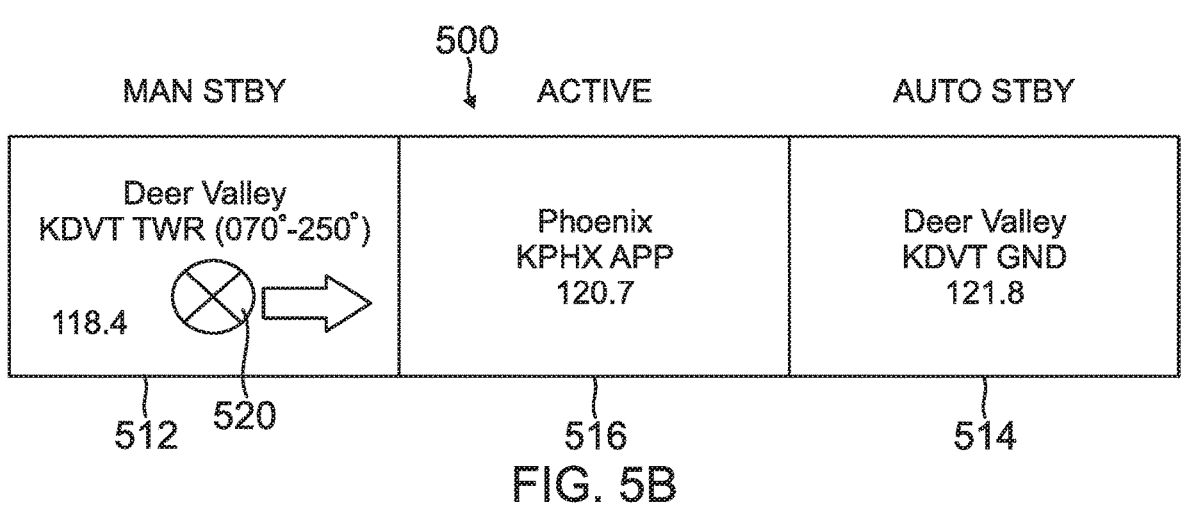
Figure 5C:
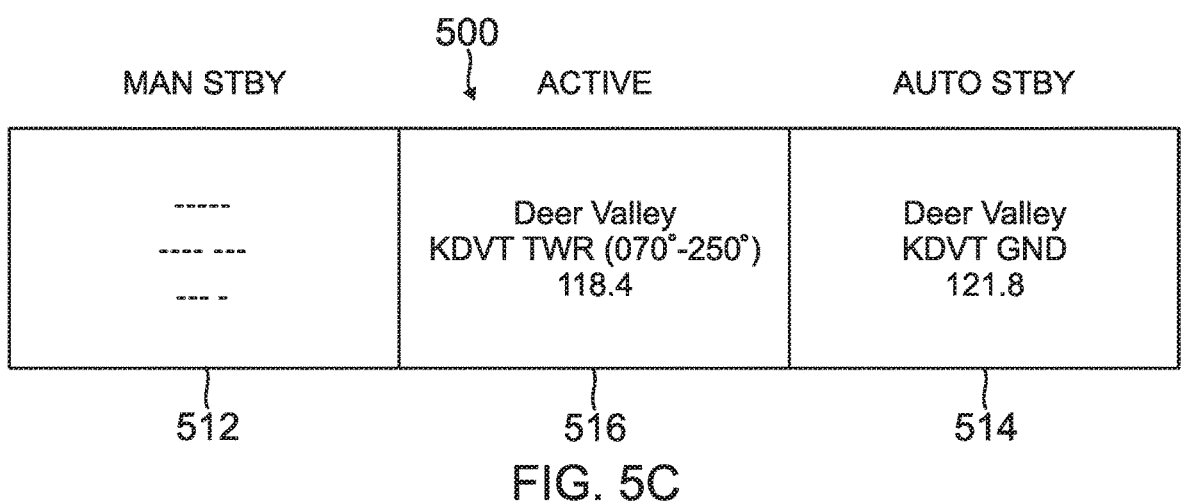

FIGS. 5A-5C illustrate another exemplary design option and operation for a three-way radio switch 500 implemented as a touchscreen radio switch for an aircraft. As shown in FIG. 5A, radio switch 500 comprises a MAN STBY button 512 configured to display a standby frequency manually input by the pilot (e.g., frequency of 118.4 MHz, Deer Valley KDVT TWR))(070°-250°. An AUTO STBY button 514 is configured to display a standby frequency automatically input by the radio system (e.g., frequency of 121.8 MHz, Deer Valley KDVT GND). An ACTIVE button 516 is configured to show a currently selected radio frequency (e.g., frequency of 120.7 MHz, Phoenix KPHX APP).

If the pilot has manually selected the next expected frequency, which the automation agrees with, then the automation will select the frequency that is one more out, which allows for additional pilot planning. In one interaction option, the pilot can select the appropriate MAN STBY frequency by touching button 512 at 520 and swiping towards the center of switch 500 to move the MAN STBY frequency information to the ACTIVE frequency window of button 516, as shown in FIG. 5B. In another interaction option, the pilot can select the MAN STBY frequency by touching button 512 in a single press at 520, which will move the MAN STBY frequency information to the ACTIVE frequency window of button 516.

When the MAN STBY frequency is selected and moved to the ACTIVE frequency window of button 516, there is no manually entered STBY frequency shown by button 512, and the moved MAN STBY frequency information is now displayed by button 516, as depicted in FIG. 5C. The AUTO STBY button 514 is automatically updated to show the next expected frequency information (e.g., Deer Valley KDVT GND, 121.8 MHz).

Figure 6A:
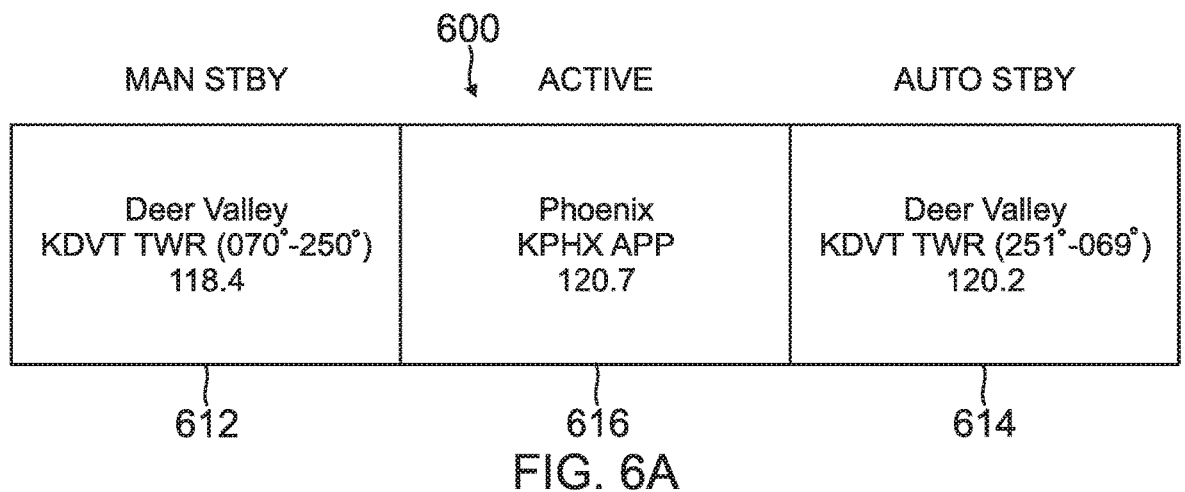
FIGS. 6A-6C are diagrams illustrating further operations of a three-way radio switch implemented as a touchscreen radio switch.
Figure 6B:
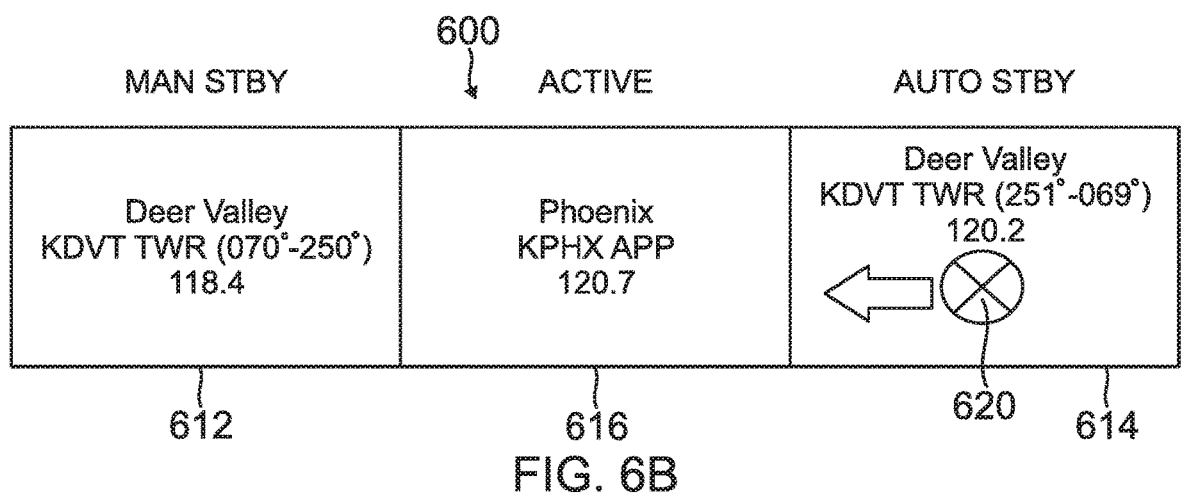
Figure 6C:
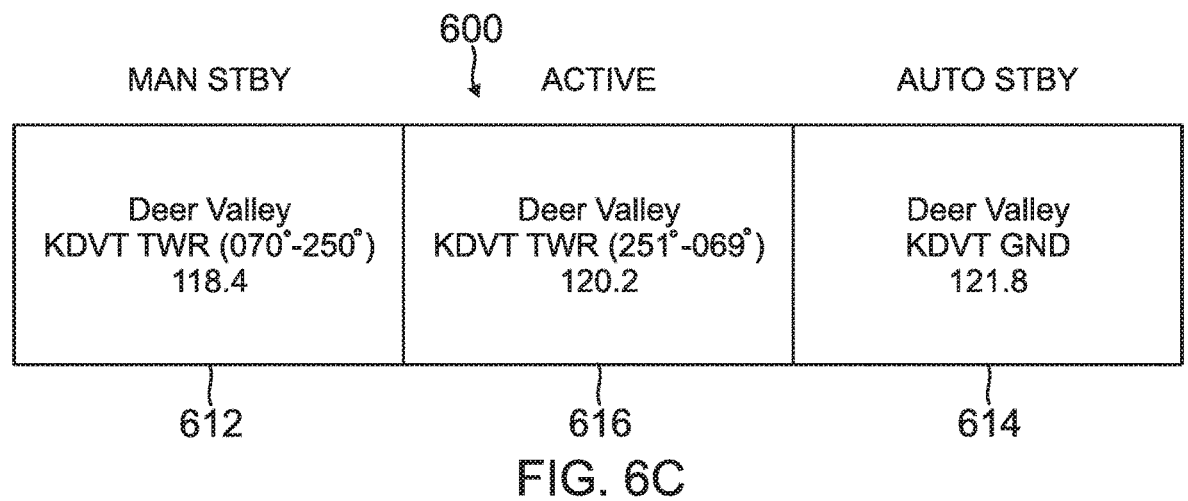

FIGS. 6A-6C illustrate further operations of a three-way radio switch 600 implemented as a touchscreen radio switch for an aircraft. As shown in FIG. 6A, radio switch 600 comprises a MAN STBY button 612 configured to display a standby frequency manually input by the pilot (e.g., frequency of 118.4 MHz, Deer Valley KDVT TWR (070°-250°)). An AUTO STBY button 614 is configured to display a standby frequency automatically input by the radio system (e.g., frequency of 120.2 MHz, Deer Valley KDVT TWR)) (251°-069°. An ACTIVE button 616 is configured to show a currently selected radio frequency (e.g., frequency of 120.7 MHz, Phoenix KPHX APP).

If the AUTO STBY frequency is selected by the pilot, then the AUTO STBY frequency information is moved to the ACTIVE frequency window of button 616. For example, in one interaction option, the pilot can select the AUTO STBY frequency by touching button 614 at 620 and swiping towards the center of switch 600 to move the AUTO STBY frequency information to the ACTIVE frequency window of button 616, as shown in FIG. 6B. In another interaction option, the pilot can select the AUTO STBY frequency by touching button 614 with a single press at 620, and the AUTO STBY frequency information will be moved to the ACTIVE frequency window of button 616.

When the AUTO STBY frequency is selected and moved to the ACTIVE frequency window of button 616, the manual STBY frequency stays the same, as shown in FIG. 6C, and MAN STBY button 612 is no longer available for use. The AUTO STBY button 614 is automatically updated to show the next expected frequency information (e.g., Deer Valley KDVT GND, 121.8 MHz).

EXAMPLE EMBODIMENTS

Example 1 includes a switching system, comprising: a three-way radio switch for an onboard radio system in a vehicle, the three-way radio switch comprising: a manual standby frequency switch configured to receive and display a standby radio frequency manually input by a user; an automated standby frequency switch configured to receive and display a standby radio frequency automatically input by the system; and an active frequency switch configured to show a currently selected radio frequency, the active frequency switch operative to: receive and display the radio frequency from the manual standby frequency switch when selected by the user; or receive and display the radio frequency from the automated standby frequency switch when selected by the user; and a processor in operative communication with the three-way radio switch, the processor operative to execute instructions to perform a method comprising: monitoring one or more frequencies of the onboard radio system in real-time; comparing the one or more frequencies of the onboard radio system with one or more frequencies from a database containing regional radio frequencies; triggering an alert to the user when the one or more frequencies of the onboard radio system do not match the one or more frequencies from the database; and sending an updated standby radio frequency to the automated standby frequency switch.

Example 2 includes the switching system of Example 1, wherein the three-way radio switch is implemented on an interface that allows for the selection of an automatically generated standby frequency or frequencies, or a manually entered standby frequency or frequencies.

Example 3 includes the switching system of any of Examples 1-2, wherein the three-way radio switch is implemented as a touchscreen radio switch.

Example 4 includes the switching system of Example 3, wherein each of the manual standby frequency switch, the automated standby frequency switch, and the active frequency switch, are implemented with touchscreen soft buttons that include display windows for showing frequency information.

Example 5 includes the switching system of Example 4, wherein: the active frequency switch comprises a center touchscreen soft button configured to show currently selected radio frequency information in an active frequency window; the manual standby frequency switch comprises a first touchscreen soft button, on a first side of the center touchscreen soft button, and configured to show manual standby frequency information in a manual standby frequency window; and the automated standby frequency switch comprises a second touchscreen soft button, on an opposing second side of the center touchscreen soft button, and configured to show automated standby frequency information in an automated standby frequency window.

Example 6 includes the switching system of Example 5, wherein: when a user selects the manual standby frequency using the first touchscreen soft button, the manual standby frequency information is moved to the active frequency window; and the automated standby frequency window is automatically updated to show the next expected frequency information.

Example 7 includes the switching system of Example 5, wherein: when a user selects the automated standby frequency using the second touchscreen soft button, the automated standby frequency information is moved to the active frequency window; and the automated standby frequency window is automatically updated to show the next expected frequency information.

Example 8 includes the switching system of any of Examples 1-2, wherein the three-way radio switch is implemented as a mechanical radio switch.

Example 9 includes the switching system of Example 8, wherein each of the manual standby frequency switch, the automated standby frequency switch, and the active frequency switch, are implemented with mechanical pushbuttons.

Example 10 includes the switching system of any of Examples 1-9, wherein the three-way radio switch is located in an aircraft.

Example 11 includes the switching system of any of Examples 1-10, wherein the standby radio frequency is automatically input by the system using data analytics.

Example 12 includes the switching system of Example 11, wherein the data analytics track and process parameters comprising aircraft position, vertical and lateral trajectory level, and frequencies before and after a frequency transition as well as time and location that the frequency transition took place.

Example 13 includes the switching system of any of Examples 1-12, wherein the standby radio frequency is automatically input by the system using a heading update and an altitude preselector update.

Example 14 includes a navigation detection and alerting method operative to verify that a valid radio frequency is selected for a current position of an aircraft, the method comprising: identifying and tagging all regional frequencies based on a flight plan using inputs from one or more databases; sampling and monitoring an onboard radio frequency tuned from one or more channels; comparing the onboard radio frequency against one or more of the regional frequencies, based on at least one of the current position and the flight plan, to determine the correctness of the onboard radio frequency; and triggering an alert notification to a pilot of the aircraft when there is a mismatch between the onboard radio frequency and the one or more of the regional frequencies.

Example 15 includes the method of Example 14, wherein the sampling and monitoring of the onboard radio frequency occurs in real time.

Example 16 includes the method of any of Examples 14-15, wherein the regional radio frequencies are obtained from at least one of a terrain database and a navigation database.

Example 17 includes the method of any of Examples 14-16, wherein the alert notification comprises at least one of an aural indicator and a visual indicator located on an onboard di splay system.

Example 18 includes the method of any of Examples 14-17, wherein the triggering of the alert notification sends an automated broadcast message or a datalink downlink message to at least one of an airline operational center (AOC) and air traffic control (ATC).

Example 19 includes the method of Example 18, wherein the automated broadcast message is sent using a system comprising automatic dependent surveillance-broadcast (ADS-B), or ADS-contract (ADS-C).

Example 20 includes the method of any of Examples 14-19, further comprising triggering an alert notification when an onboard radio is not tuned to an emergency frequency.

The present invention may be embodied in other specific forms without departing from its essential characteristics. The described embodiments are to be considered in all respects only as illustrative and not restrictive. The scope of the invention is therefore indicated by the appended claims rather than by the foregoing description. All changes that come within the meaning and range of equivalency of the claims are to be embraced within their scope.

What is claimed is:
1. A switching system, comprising:
a three-way radio switch for an onboard radio system in a vehicle, the three-way radio switch comprising:
 a manual standby frequency switch configured to receive and display a standby radio frequency manually input by a user, the manual standby frequency switch configured to show manual standby frequency information in a manual standby frequency window;
 an automated standby frequency switch configured to receive and display a standby radio frequency automatically input by the system, the automated standby frequency switch configured to show automated standby frequency information in an automated standby frequency window; and
 an active frequency switch configured to show currently selected radio frequency information in an active frequency window, the active frequency switch operative to:
  receive and display the radio frequency from the manual standby frequency switch when selected by the user; or
  receive and display the radio frequency from the automated standby frequency switch when selected by the user; and
a processor in operative communication with the three-way radio switch, the processor operative to execute instructions to perform a method comprising:
 monitoring one or more frequencies of the onboard radio system in real-time;
 comparing the one or more frequencies of the onboard radio system with one or more frequencies from a database containing regional radio frequencies;
 triggering an alert to the user when the one or more frequencies of the onboard radio system do not match the one or more frequencies from the database; and
 sending an updated standby radio frequency to the automated standby frequency switch;
 wherein when a user selects the manual standby frequency switch, the manual standby frequency information is moved to the active frequency window, and the automated standby frequency window is automatically updated to show the next expected frequency information;
 wherein when a user selects the automated standby frequency switch, the automated standby frequency information is moved to the active frequency window, and the automated standby frequency window is automatically updated to show the next expected frequency information.

2. The switching system of claim 1, wherein the three-way radio switch is implemented on an interface that allows for the selection of an automatically generated standby frequency or frequencies, or a manually entered standby frequency or frequencies.

3. The switching system of claim 1, wherein the three-way radio switch is implemented as a touchscreen radio switch.

4. The switching system of claim 3, wherein each of the manual standby frequency switch, the automated standby frequency switch, and the active frequency switch, are implemented with touchscreen soft buttons that include display windows for showing frequency information.

5. The switching system of claim 4, wherein:
the active frequency switch comprises a center touchscreen soft button configured to show the currently selected radio frequency information in the active frequency window;
the manual standby frequency switch comprises a first touchscreen soft button, on a first side of the center touchscreen soft button, and configured to show the manual standby frequency information in the manual standby frequency window; and
the automated standby frequency switch comprises a second touchscreen soft button, on an opposing second side of the center touchscreen soft button, and configured to show the automated standby frequency information in the automated standby frequency window.

6. The switching system of claim 5, wherein:
when a user selects the manual standby frequency using the first touchscreen soft button, the manual standby frequency information is moved to the active frequency window.

7. The switching system of claim 5, wherein:
when a user selects the automated standby frequency using the second touchscreen soft button, the automated standby frequency information is moved to the active frequency window.

8. The switching system of claim 1, wherein the three-way radio switch is implemented as a mechanical radio switch.

9. The switching system of claim 8, wherein each of the manual standby frequency switch, the automated standby frequency switch, and the active frequency switch, are implemented with mechanical pushbuttons.

10. The switching system of claim 1, wherein the three-way radio switch is located in an aircraft.

11. The switching system of claim 1, wherein the standby radio frequency is automatically input by the system using data analytics.

12. The switching system of claim 11, wherein the data analytics track and process parameters comprising aircraft position, vertical and lateral trajectory level, and frequencies before and after a frequency transition as well as time and location that the frequency transition took place.

13. The switching system of claim 1, wherein the standby radio frequency is automatically input by the system using a heading update and an altitude preselector update.

* * * * *